Dec. 28, 1926.

H. C. ROSS 1,612,152

IDENTIFICATION DEVICE FOR AUTOMOBILES

Filed March 19, 1926

Inventor
Hugh C. Ross

By Owen & Owen

Attorneys

Patented Dec. 28, 1926.

1,612,152

UNITED STATES PATENT OFFICE.

HUGH C. ROSS, OF TOLEDO, OHIO, ASSIGNOR TO HARRY W. FALCONER, OF NEAR PERRYSBURG, WOOD COUNTY, OHIO.

IDENTIFICATION DEVICE FOR AUTOMOBILES.

Application filed March 19, 1926. Serial No. 95,843.

This invention relates to identification devices for automobiles of the type which are secured to the vehicle in such a manner that removal thereof will at once be evident in that the adjacent parts will be visibly mutilated or distorted.

Objects of this invention are to provide a simple and inexpensive identification device which is so constructed that after assembly separation or removal of the parts cannot be effected without materially changing the appearance of the adjacent parts, thereby indicating to the casual observer that the vehicle may have been stolen; and other objects are to provide a new and improved self-locking arrangement which effectively resists unwarranted separation of parts and is fool proof, and to produce an identification device of the above character having the unique features of construction and arrangement hereinafter described.

Figure 1:
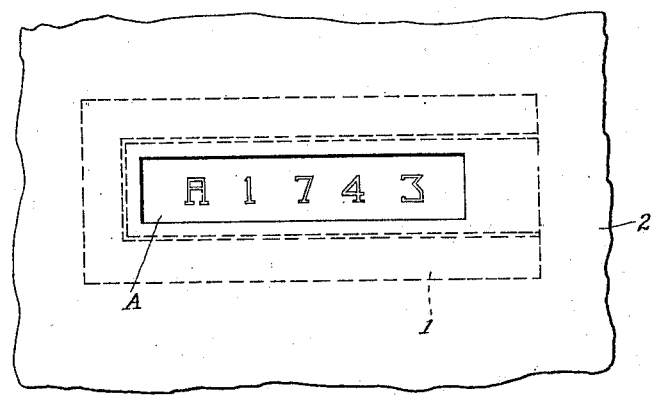
Figure 2:
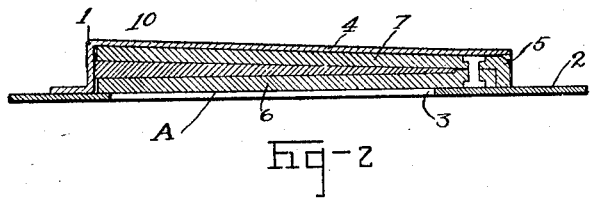
Figure 3:
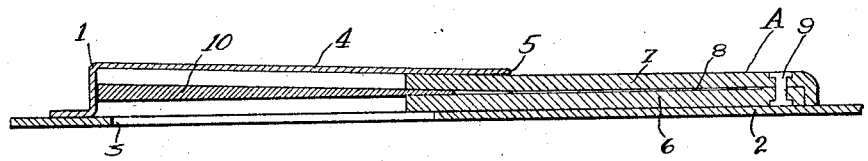

The invention is shown by way of illustration in the accompanying drawings, in which:

Figure 1 is a fragmentary side elevation of the instrument board of an automobile with my identification device secured thereto; Figure 2 is a longitudinal sectional view showing the parts in assembled relation; and Figure 3 is a view similar to Figure 2 showing the manner of assembly.

The illustrated embodiment of the invention comprises a flanged casing 1 secured to the instrument board 2 of an automobile. While the instrument board has been chosen for illustrative purposes, it is not to be considered as limited solely to this part because the device may be fixed to advantage to other parts of the vehicle as for example the engine. It will be noted that the instrument board 2 is provided with a rectangular elongate opening 3 with which the casing 1 registers. The instrument board 2 in this instance is of sheet metal as likewise is the casing, the gauge of the metal being so chosen as to be reasonably resistant to distortion or bending, and the flange of the casing may be secured to the instrument board in any suitable manner as by spot welding.

The casing 1 is preferably fixed to the inner side of the instrument board 2, and, as shown, is formed with a tapered or sloping wall 4 which may be the outer wall and an opening 5 is provided in the casing at the smaller end of the taper. The angle or degree of taper may be chosen to fit the particular needs of service, but that exemplified has been found satisfactory.

Disposed within the casing 1 is an identification device A which may contain the serial number of the automobile suitably stamped or engraved on its outer face. These numbers are arranged to be visible through the elongate opening 3 as shown in Figure 1.

It is desired to provide a self-locking arrangement for the identification device A so that when the latter is inserted into the casing 1, it will be a practical impossibility to remove the device without so cutting or distorting the adjacent parts that it may readily be noticed by a casual observer that the automobile has been tampered with. Obviously if patrolmen were instructed to glance in automobiles parked along the curb to see whether the identification devices were intact, the absence of one would at once be noted. This enables stolen cars to be readily and conveniently located.

In accordance with this invention, the device A may consist of two plates 6 and 7 having a longitudinal opening 8 therebetween, and joined at one end by a rivet 9. It will be appreciated that the plates 6 and 7 may be produced from a single block and for purposes of quantity production this construction would probably be preferable.

For expanding or separating the plates 6 and 7 and forcing them in opposite direction into intimate engagement with the instrument board 2 and tapered wall 4 respectively, an elongate wedge 10 is forced between the plates. As shown in Figure 3 the wedge 10 is first placed in the casing and thereafter the device A is forced in, the opposite end of the wedge bearing against the closed end of the casing.

The dimensions of the wedge 10 are so chosen with respect to the wall 4 that no matter how far the device A is forced into the casing whether to the full extent or part way, a binding is effected between the several parts so that removal of the device from the casing is prevented. It is further to be observed to remove the number plate would necessitate the cutting of the metal of the instrument board or otherwise affecting the outward appearance so that removal would be instantly noted.

It will be seen that I have provided a construction which satisfies the objects enumerated above and one which constitutes a valuable advance in the art. While I have shown the invention in a certain physical embodiment, it is to be understood that modifications of the structure shown may be made by those skilled in this art without departing from my invention as expressed in the following claims.

What I claim as new and desire to secure by Letters Patent is:

1. An identification device for automobiles, comprising the combination of a metallic automobile part having an opening therein, a casing fixed to one side of said part in register with said opening, said casing having an open end and an adjacent wall thereof tapering outwardly from said open end, a device in said casing visible through said opening, said device having separable parts, and means for automatically forcing one of said parts into intimate engagement with said tapered wall when said device is inserted into said casing.

2. An identification device for automobiles comprising the combination of a metallic automobile part having an opening therein, a casing fixed to one side of said part in register with said opening, said casing having an open end and an adjacent wall thereof tapering outwardly from said open end, a device in said casing visible through said opening, said device having separable parts, and wedge means for automatically forcing one of said parts into intimate engagement with said tapered wall when said device is inserted into said casing.

3. An identification device for automobiles comprising the combination of a part of an automobile having an elongate opening therein, a casing fixed to one side of said part in register with said opening, said casing having an open end and an adjacent wall thereof tapering outwardly from said open end, an expansible device in said casing having a portion visible through said opening, and means for automatically expanding said device into intimate engagement with opposed walls of the casing, said tapered wall preventing removal of said device after expansion thereof.

4. An identification device for automobiles comprising the combination of an automobile part having an elongate opening therein, a metallic casing fixed to one side of said part in register with said opening, said casing having an open end and an adjacent wall thereof tapering outwardly from said open end, a longitudinally split metallic piece in said casing having a portion visible through said opening, and a wedge disposed in the split for holding the parts in intimate engagement with the automobile part and tapered wall respectively.

In testimony whereof I have hereunto signed my name to this specification.

HUGH C. ROSS.